Dec. 15, 1942.   A. H. DOUGLASS   2,305,068
REGULATOR VALVE
Filed Nov. 6, 1941
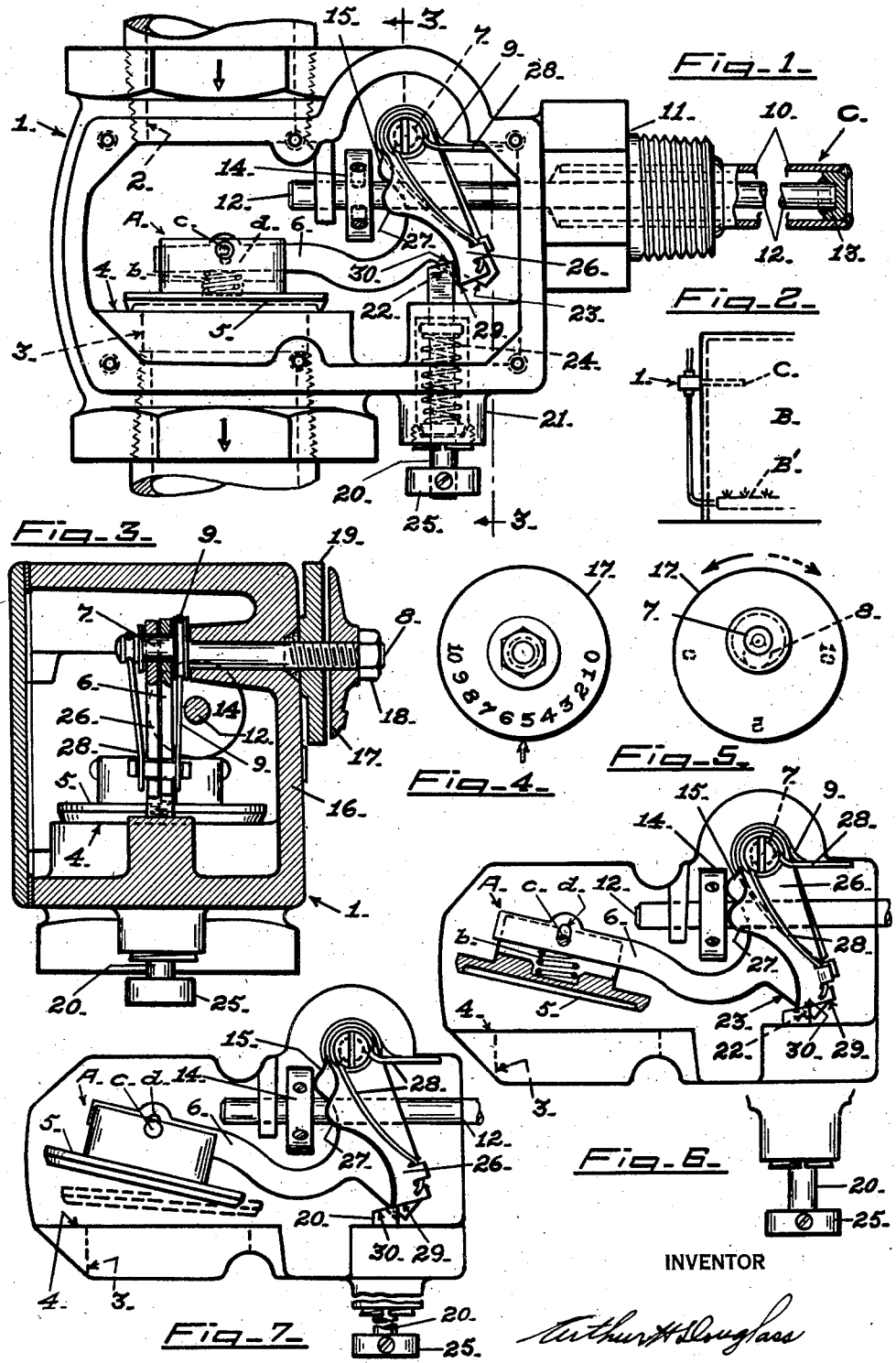
INVENTOR
Arthur H. Douglass Patented Dec. 15, 1942

2,305,068

UNITED STATES PATENT OFFICE 2,305,068

REGULATOR VALVE

Arthur H. Douglass, Los Angeles, Calif.

Application November 6, 1941, Serial No. 418,023

3 Claims. (Cl. 236—102)

My invention relates to and has for an object the provision of a regulator so improved and designed as to provide for regulation and control of inflammable gases or fluids used for heating purposes in various devices whereby, not only the gas volume is regulated in a particularly efficient manner to maintain a constant predetermined heat value in the device but automatic gas shut-off operation will be effected in a most reliable manner in case of an emergency.

Another object of the invention is to provide an inflammable gas or fluid regulator which may be readily and accurately manually set to pass the maximum gas supply desired and automatically thereafter pass a gas volume proportionally requisite to maintain the predetermined maximum heating effort for which the regulator is set, and in addition provide for automatic shut-off of the gas supply when the maximum heating effort is, from any cause, exceeded and requires inspection and manual resetting of the regulator for resumption of normal flow regulating operation.

With the above and other objects in view the invention consists in the novel construction and combination of parts hereinafter described, illustrated in the accompanying drawing, and set forth in the claims hereto appended, it being understood that various changes in form, proportion, size and minor details of construction within the scope of the claims may be resorted to without departing from the spirit or sacrificing any of the advantages of the invention.

In the drawing:

Figure 1 is an elevational, part sectional view with the body closure cover removed for illustration of the internal parts.

Figure 2 is a fragmentary schematic view illustrating a typical application of the regulator to a heating device.

Figure 3 is a sectional view on line 3—3 of Figure 1.

Figure 4 is a front view of the regulator control dial.

Figure 5 is a "rear" view of the control dial showing the eccentric stem.

Figure 6 is a schematic part sectional view showing the relation of the regulator parts just subsequent to manual resetting after automatic shut-off action.

Figure 7 is a schematic view showing the relation of parts when the valve operates under normal conditions as regulative of the gas volume between low and maximum limits for which the regulator is set.

One embodiment of my invention as shown in the drawing includes a chambered valve body 1, an inlet 2, an outlet 3, a valve seat 4 and a valve mechanism A for controlling the outlet so that the flow of gas to a heating device; for example the one B wherein the regulator is mounted and connected by suitable conduit to the burner B' shown in Figure 2, may be regulated responsive to a thermomotive means C. This thermomotive means together with the valve mechanism A provides for regulating the gas flow responsive to the heating effort of the heating device and also operates, as will be hereinafter more fully explained, to automatically cut off the gas flow when the action of the thermomotive device exceeds that required to effect a predetermined regulatory flow.

The valve member or disc 5 is yieldingly mounted to coact with respect to and be carried by one end of the angular arm or lever 6. This yielding movement or overtravel of the end of the arm 6 with respect to the valve 5 when substantially closed upon the seat 4 is effected by "spring-loading" the valve 5 with respect to the end of the lever 6, and as here shown consists of the spring b interposed between the lever and valve disc which is in turn secured to the lever by means of the pin c working in the slot d. By means of this spring-loaded valve arrangement a minutely small but still open relation of the disc with respect to the seat is provided for as an essential operating feature of the valve mechanism when adjusted for close regulation of fluid flow therethrough and further provides for requisite overtravel of the lever parts of the mechanism effecting the complete shut-off emergency action of the parts later described. The other end of the lever 6 is fulcrumed on the eccentric member 7 on an adjusting shaft 8. A spring 9 is engaged with the body 1 and arm 6 so as to urge the valve mechanism A into open position.

The thermomotive device C includes a tubular element 10 having a high coefficient of expansion fixed at its inner end to a fitting member 11 on the body 1 and free at its outer end. A rod 12, having a low coefficient of expansion, is fixed as at 13 at its outer end to the outer end of the element 10 and is slidably mounted in the fitting 11 and body 1. A drive disc 14 is fixed on the rod 12 so as to contact a projection 15 on the valve arm 6. As the element 10 expands the rod 12 is moved so that the disc 14 engages the projection 15 and moves the arm 6 whereby the valve will be moved towards its seat. As the element 10 contracts, the rod 12 is moved so that the pressure of the disc 14 against the arm is relieved and the spring 9 will move the arm 6 to open the valve.

The adjusting shaft 8 is extended through a wall 16 of the body so that an adjusting dial 17 and lock nut 18 may be mounted on the outer end thereof. The set position of the dial being secured by the lock nut 19. When turned by means of the dial 17, the shaft 8 provides for setting the valve to regulate the volume flow through the outlet 3, due to the action of the eccentric 7. For illustration, Figures 3, 4 and 5, show the indicia dial 17 and eccentric 7 as set midway between manual adjustment extremes. In particular; reference to Figure 5 shows the eccentric 7, the dial 17 and indicia thereon in true illustrative view relation to that of the parts as shown in Figures 1, 6 and 7. It is apparent that movement of either the disc 14 or the position of the fulcrum of the valve lever 6 relative thereto, when moved either toward or away from the disc, causes a change of position of the valve mechanism A in relation to the outlet opening 3. With the disc 14 in contact, at any stage of thermomotive position, with the valve lever projection 15; manual turning of the dial counterclockwise toward the zero indices, as viewed in Figure 5, causes the eccentric mounted fulcrum of the lever 6 to move toward the disc 14 and adjust the valve A to a more nearly closed position relative to the outlet 3 and turning of the dial clockwise toward the maximum indices adjusts the valve to a more open position.

Thus it is seen that the range of the flow regulating movement of the valve may be varied by means of the adjusting shaft 8 and its associated elements and that the thermomotive means will automatically adjust the valve within the regulatory range determined by the setting of the adjusting shaft, to regulate the gas flow proportionate to the desired heating effort of the heating device. When the desired adjustment is made, the shaft 8 is locked by means of the nut 19.

I provide a means for acting on the arm 6 to close the valve mechanism A when the effort of the thermomotive device exceeds that required to move the valve within the range of its regulatory movement as determined by the setting of the aforesaid adjusting means. In other words I provide a shut-off means, which; when the minimum heating effort for which the regulating means hereof is set and which from any cause overheats the device the regulator is adapted to control, will automatically close the valve. This shut-off means is also adapted for manual operation, at will, to reset the valve for its given regulatory action.

As here provided the shut-off means includes a spring loaded plunger 20 of square cross section, in part, slidably supported in a boss 21 of the body 1 in such manner that a cam surface 22 on the inner end of the plunger will contact an inclined surface 23 on the arm 6 whereby said arm will be moved to close the valve when the plunger is extended by the spring 24. This spring is of greater force than the spring 9, whereby the plunger will quickly close the said valve and hold it closed until the plunger is retracted. On its outer end the plunger 20 has a handle or grip 25 whereby it may be manually retracted to allow the spring 9 to again open the valve for further regulatory action under control of the thermomotive device.

To control the spring urged plunger 20 so that it becomes operative only when the movement of the thermomotive device exceeds that required to effect a predetermined flow regulating action of the valve, I employ a detent arm 26 pivoted on the eccentric 7 and having a projection 27 adapted to engage the drive disc 14. When the plunger is retracted the detent 26 is moved by means of a spring 28, similar to the spring 9, so that an inclined surface 29 on the lower end of the detent will engage a correspondingly inclined surface 30 on the inner end of the plunger to set the detent as shown in Figure 6, and thereby restrain the plunger whereby the regulatory movement of the valve may take place within the range predetermined by the setting of the valve. Due to the inclined surfaces 29 and 30, the detent 26 positively maintains the plunger 20 in retracted position but effects release of the plunger and closing of the valve upon very small movement (see Figure 7) occasioned by a very limited overheated action of the thermomotive device in excess of the temperature the predetermined range of fluid flow is alloted to provide. In consequence; when, for any reason the valve closing movement of the rod 12 is slightly greater than that required to obtain the minimum flow of gas for which the regulator is set, the disc 14 will move the detent 26 from the position shown in Figure 7 which is the "minimum flow" position of the detent, to the right, and clear of the plunger 20, which is immediately released, projects against and moves the arm 6 so that the valve will be power-urged to its closed position.

It is worthy of note that the provision of the yieldingly operative means employed in the valve mechanism A, as above described, provides for thermomotive adjustment desirable as reducing the fluid flow area of the valve to an almost negligible normally operating minimum and in addition provide for further functional action of the thermomotive means applicable in effecting complete emergency shut-off of the fluid flow. For, as now apparent, by these means the overtravel movement of the overheated thermomotive element is adapted to function to move the detent 26 to release the plunger 20 and effect complete and continued shut-off of the valve until manually reset for normal operation.

With reference to the foregoing description, and the drawing: Figure 1 as shown and described illustrates the relation of the parts in emergency shut-off position with the valve power-urged against the valve seat to completely close the outlet opening. Figure 6 illustrates the position of the regulator parts just subsequent to the combined manual operation of resetting the valve for resumption of normal operation and recocking the means for emergency shut-off. Figure 7, wherein, both the valve means and the shut-off means are illustrated in positions consequent to continued normal operation in regulation of the fluid flow and as further illustrative of at least one cycle of action of the thermomotive device as operating to open and close the valve between normal limits and as having "set" the shut-off means to fine adjustment for emergency release.

I claim:

1. In a regulator, a valve body having an inlet and an outlet, a valve controlling said outlet, an adjusting shaft rotatably supported on the body, an eccentric member on said shaft, an arm fulcrumed on said eccentric member and connected to said valve whereby to effect opening and closing movements of the valve when the arm is moved on its fulcrum and to change the setting of the valve on turning said shaft, a thermomotive means on said body, means for setting said valve for operation within a predetermined flow range, a drive member actuated by said thermomotive means for engaging and moving said arm sufficiently only to move the valve within said range, spring means associated with said arm for urging said valve into open position, a spring loaded means on said body of greater force than said spring means, for engaging and urging said arm to position closing the valve, a detent member fulcrumed on the eccentric and engaging said drive member and holding the spring loaded means against operation while the valve is moved within said range and releasing said spring loaded means when the thermomotive means makes an effort greater than that required to effect the aforesaid regulatory movement of said valve.

2. In a regulator, a valve body having an inlet and an outlet, a valve controlling said outlet, an adjusting shaft rotatably supported on the body, an eccentric member on said shaft, an arm fulcrumed on said eccentric member and connected to said valve whereby to effect opening and closing movements of the valve when the arm is moved on its fulcrum and to change the setting of the valve on turning said shaft, a thermomotive means on said body, means for setting the valve for operation within a predetermined flow regulating range, a drive member actuated by said means for engaging and moving said arm sufficiently only to move the valve within said range, spring means associated with said arm for urging said valve into open position, a spring loaded means on said body of greater force than said spring means for engaging and urging said arm to position closing the valve, a detent member fulcrumed on the eccentric and engaging said drive member and holding the spring loaded means against operation while the valve is moved within said range and releasing said spring loaded means when the thermomotive means makes an effort greater than that required to effect the aforesaid regulatory movement of said valve, a handle for retracting said spring loaded means and allowing said spring means to open the valve for operation within said range, and a spring operable when the spring loaded plunger is retracted for moving said detent back into position for holding said spring urged means against operation.

3. In a regulator, a valve body having an inlet and an outlet, a valve controlling said outlet, an arm connected to the valve and pivoted on the body for movement to open and close the valve, a spring associated with said arm and said body for urging the valve into open position, a thermomotive device movable against said arm to move the valve towards its seat and away from said arm to permit the spring to open the valve whereby to effect a predetermined flow regulating movement of the valve, a spring loaded plunger of greater force than the spring on said arm for engaging and moving said arm to close said valve, a detent member pivoted on the body for engaging and holding said plunger against operation during said flow regulating movement of said thermomotive device and being engaged and moved by said device for releasing said plunger when said device exceeds said predetermined movement.

ARTHUR H. DOUGLASS.